June 5, 1923.
W. R. COCHRAN
1,457,498
STABILIZER FOR MOTOR VEHICLE SPRING SUSPENSIONS
Filed May 10, 1922
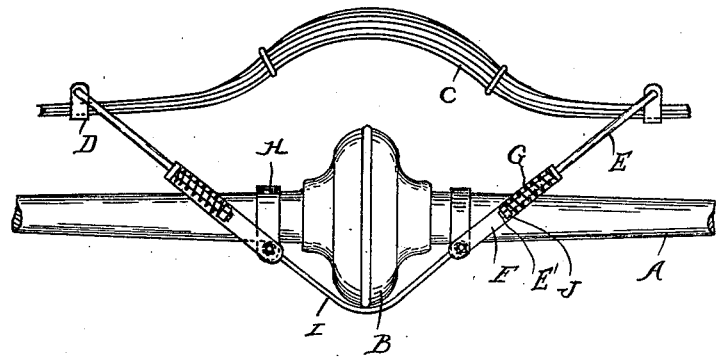
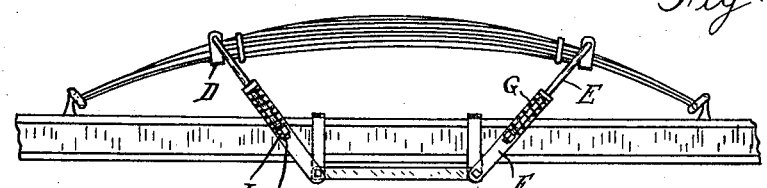
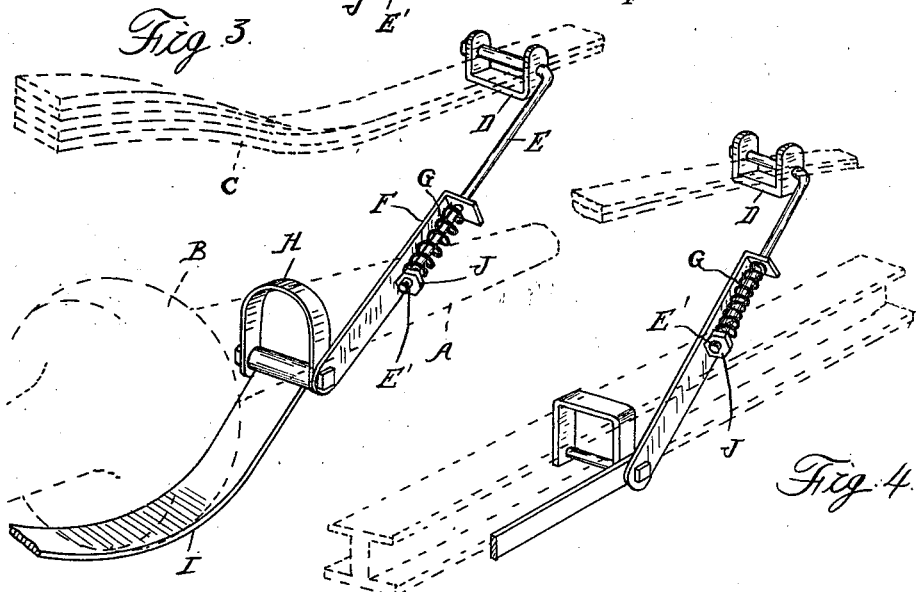
Inventor
William R. Cochran
By Whittemore Hulbert Whittemore
& Belknap        Attorneys Patented June 5, 1923.

1,457,498

UNITED STATES PATENT OFFICE.

WILLIAM R. COCHRAN, OF DETROIT, MICHIGAN, ASSIGNOR OF FOUR-FIFTHS TO DANIEL P. CASSIDY, JOHN G. CROSS, THOMAS W. PARKER, AND S. WALDEMAN SORENSEN, ALL OF DETROIT, MICHIGAN.

STABILIZER FOR MOTOR-VEHICLE SPRING SUSPENSIONS.

Application filed May 10, 1922. Serial No. 559,705.

*To all whom it may concern:*

Be it known that I, WILLIAM R. COCHRAN, a citizen of the United States of America, residing at Detroit, in the county of Wayne and State of Michigan, have invented certain new and useful Improvements in Stabilizers for Motor-Vehicle Spring Suspensions, of which the following is a specification, reference being had therein to the accompanying drawings.

The invention relates to stabilizers for use on spring suspensions of motor cars, being more particularly designed for use in connection with the Ford car, but also applicable to other constructions. The invention consists in the novel construction as hereinafter set forth.

In the drawings:

Figure 1 is a rear elevation showing the construction of stabilizer as applied to the rear cross spring of a Ford car;

Figure 2 is an elevation showing the stabilizer as applied to the front spring;

Figures 3 and 4 are perspective views of the constructions shown in Figures 1 and 2.

A is the rear axle of a motor car, such as the Ford, having the center enlargement B forming the housing for the differential gearing. C is the rear cross spring. My improved stabilizer comprises clips D which are secured to the spring near the ends thereof, rods E pivotally engaging said clips and extending obliquely therefrom towards the center of the car, swivel brackets F through which the rods E slidably pass and springs G sleeved on the rods abutting at one end against the swivel bracket and at the opposite end against a shoulder on the rod. The swivel brackets F are secured by clips H embracing the axle housing and to hold said clips from displacement, a connecting rod or strap I extends from the one on the one side of the differential gearing to that on the opposite side thereof.

With the construction as described, the flexing of the springs C will cause a relative longitudinal movement of the oblique rods E in the swivel brackets F and the springs G will operate to take up the motion when the rods move inwardly and will yield when said rods move outwardly. However, the direction of the application of force of the spring G being at an oblique angle to the movement of the spring C, the oscillations of the latter are checked so as to impart greater stability to the structure. The construction is one which is easily manufactured, the clips, the bracket F and the member I being formed of flat bar stock and the rods E of round bar stock. The cost of construction is therefore relatively low and the device is one which can be easily applied.

In Figures 2 and 4 the construction is shown as applied to the front spring and front axle of the vehicle, but otherwise it is the same as that previously described.

The pivotal connection between the rod E and the clips D is preferably formed by an angle bend in said rod. The opposite end of the rod has a threaded portion E' and an adjustable nut J on said rod serves to alter the tension of the spring G.

What I claim as my invention is:

1. The combination with an axle and a spring arranged parallel thereto, of a stabilizer comprising clips respectively secured to the spring and the axle, an obliquely inclined rod extending between said clips and pivotally engaging the same, and a spring sleeved upon said rod having its opposite ends respectively bearing against one of said clips, and an abutment on the rod.

2. The combination with a vehicle axle and a spring extending in a plane parallel thereto, of clips respectively engaging the axle near the center thereof and the outer ends of said spring, rods attached to said clips extending obliquely therebetween and slidably engaging one of said clips, and a spring sleeved upon each of said rods having one end abutting against the bearing on the clip and the opposite end engaging a shoulder on the rod.

3. The combination with a vehicle axle and a spring arranged in a plane parallel thereto, of clips secured to said spring adjacent to the opposite ends thereof, clips engaging said axle on opposite sides of the center thereof, a yoke for connecting the latter clips to each other, swivel brackets engaging the clips on opposite sides of the center of said axle, obliquely arranged rods extending between said swivel brackets and the clips engaging said spring being pivotally attached to the latter, and springs sleeved on said rods abutting at one end against said swivel brackets and at their opposite ends against a shoulder on the rod.

4. The combination with a vehicle axle and a spring arranged in a plane parallel thereto, of clips engaging said axle upon opposite sides of the center thereof, a yoke for cross-connecting said clips, angle brackets pivotally engaging said yokes, clips engaging the outer end portions of the spring, rods pivotally engaging the latter clips and extending obliquely through apertures in said angle brackets, springs sleeved upon said rods having one end abutting against said angle brackets, and adjustable nuts on said rods forming abutments for the opposite ends of said springs.

In testimony whereof I affix my signature.

WILLIAM R. COCHRAN.